2,790,787
POLYMERIC MALEIMIDE DERIVATIVES

Pliny O. Tawney, Passaic, N. J., assignor to United States Rubber Company, New York, N. Y., a corporation of New Jersey No Drawing. Application May 25, 1953,
Serial No. 357,342

4 Claims. (Cl. 260—65)

This invention relates to improvements in polymerizable chemicals, their preparation and use.

An object of the invention is to provide new products consisting of certain maleimidomethyl

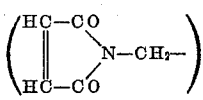

esters, and to provide resinous polymerizates, especially resinous heteropolymers, produced from the said maleimidomethyl esters. Further objects will be apparent from the hereinafter description.

The novel esters referred to subscribed to the formula

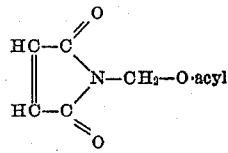

These novel compounds can be prepared by a metathetical reaction between a suitable compound containing the radical —O·acyl and a suitable compound of the formula

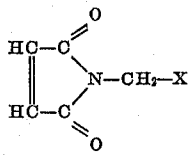

where X is either hydroxyl, chlorine or bromine; the acyl group may contain additional carboxylic groups which are not esterified by maleimidomethyl groups.

I have further discovered that the new acyloxy esters can be used to produce new resinous products, especially resinous products which are heteropolymers of such monomeric esters with other monomeric ethylenic compounds having a terminal ethylenic group, $CH_2=C<$, which is non-conjugated with respect to any other ethylenic group that may be present.

The heteropolymers, like the homopolymers, are valuable resins useful in making molded articles, and as varnish bases for making varnishes which as dried films are hard, clear, heat-resistant and mar-resistant.

Polystyrene is extensively used in making clear, molded articles. However, these articles are rather brittle and easily broken at room temperature. Also, they are thermoplastic, and hence subject to distortion, at temperatures well below 100° C.

A further object of this invention, therefore, is to provide heteropolymers which are not only superior to polystyrene in these properties, but which, unlike those derived from maleimide, N-alkylmaleimide and N-cycloalkylmaleimide (U. S. Patent No. 2,342,295), are thermosettable to the insoluble, infusible state. The difference resides in the fact that the maleimidomethyl esters are trifunctional monomers by reason of the ethylenic group and the —O·acyl substituent and therefore can operate to provide the crosslinks which are required for achieving insolubility and infusibility in coatings and castings.

This crosslinking ability of the acyloxy group is surprising. Normally compounds having the structure $>N-(CH_2)_n-O\cdot acyl$ (where $n$ is at least 2) do not split off the —O·acyl to give a radical capable of crosslinking. The compounds used in this invention, i. e., compounds containing a methylene bridge between the ring nitrogen and the group —O·acyl, are thus seen to be unique.

The new monomeric esters can be made from one or another of the compounds N-methylolmaleimide and N-(chloromethyl)maleimide by metathetical reaction with a suitable compound which furnishes the group —O·acyl. N-(bromomethyl)maleimide may, if desired, be used in place of the corresponding chloro compound.

Representative of said reactions are the following:

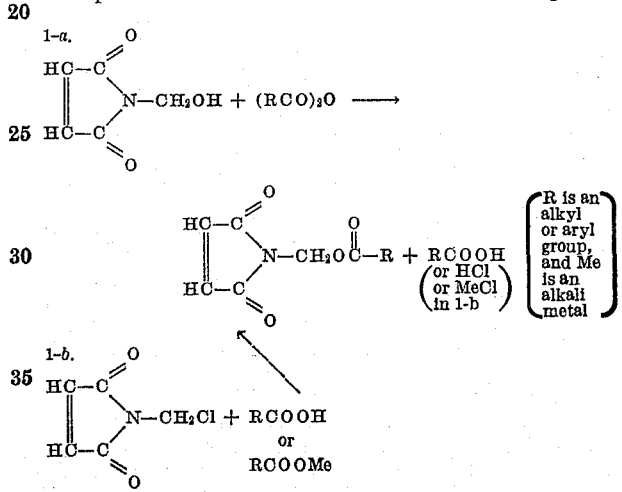

The maleimidomethyl esters may be interpolymerized with 1-ethylenic ($CH_2=C<$) compounds, to form useful resins whose properties can be varied widely to fit various desired uses by suitably varying the comonomer or comonomers both in type and amount. The new monomers can be so interpolymerized in a wide range of ratios; e. g., as little as 1% of maleimidomethyl ester may become combined with 99%, by weight, of the comonomer. It is usually preferred to have at least about 5% of the maleimidomethyl ester in the mixture of comonomers, in order to effect a material improvement in the properties of the heteropolymer over those of the homopolymers of the copolymerizable vinyl compound.

Among such copolymerizable ethylenic, or vinyl, compounds are the following: styrene; alpha-, ortho-, meta-, and para-methylstyrenes; the divinylbenzenes; the acrylic-type nitriles, amides, acids and esters; the allylic-type carboxylic esters and alcohols; the monovinyl pyridines; the vinyl esters of halogen acids or of carboxylic acids; vinylidene chloride; the alkyl vinyl ethers; the alkyl vinyl ketones, the alkyl isopropenyl ketones; the isopropenyl carboxylic esters, e. g., isopropenyl acetate; and the olefin and non-conjugated diolefin hydrocarbons containing a terminal methylene group, e. g., octene-1, isobutylene, diisobutylene and dimethallyl.

The usable acrylic-type compounds are those having the structure

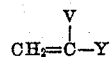

where V is hydrogen, methyl or chlorine, and Y is —CN, $-CO-N\begin{smallmatrix}R\\ \\R'\end{smallmatrix}$ or —COOR, and R and R' are hydrogen, alkyl, alkenyl, cycloalkyl, aralkyl or aryl. The most important monomers of this type are acrylonitrile, the alkyl acrylates and the alkyl methacrylates.

The usable allylic-type esters and alcohols are those having the structure $$\left( CH_2=\overset{V}{\underset{|}{C}}-CH_2- \right)_n -W$$

where V is defined as in the preceding paragraph, $n$ is an integer which is one or two, and W is $$-OH \text{ or } -O\overset{O}{\underset{\|}{C}}-R'''$$

when $n$ is one (R''' being an alkyl, alkenyl, cycloalkyl, aryl, or aralkyl group), and W is the diacid residue of a dibasic acid when $n$ is two. Important monomers of this class are allyl acetate, dimethallyl succinate and diallyl phthalate.

The usable monovinylpyridines are the unsubstituted vinylpyridines, viz., the 2-, 3- and 4-vinylpyridines; and the alkyl-substituted vinylpyridines, e. g., 2-methyl-5-vinylpyridine, 5-ethyl-2-vinylpyridine, 2-methyl-6-vinylpyridine and 2-ethyl-4-vinylpyridine.

The vinyl esters have the structure $CH_2=CH-A$, where A is a chlorine or acyloxy radical. The most important monomers of this group are vinyl chloride and vinyl acetate.

Herein the word "heteropolymer" is used to cover copolymers of any single maleimidomethyl ester with any single ethylenic ($CH_2=C<$) comonomer, copolymers of two or more maleimidomethyl esters with one or more of the ethylenic compounds, and copolymers of a single maleimidomethyl ester with two or more of the ethylenic compounds.

These heteropolymers, after partial polymerization to form soluble polymerizates, can be further interpolymerized with other unsaturated materials, e. g., with alkyd resins of unsaturated polybasic acids such as maleic acid and fumaric acid; and with maleic, fumaric and methylenemalonic esters of monohydric alcohols.

The new heteropolymers are made in the presence of a catalyst which generates free radicals. The typical of such polymerization catalysts are the organic hydroperoxides and peroxides, the peroxysulfates, and the decomposable azo compounds, e. g., N,N'-azobis-(alpha-isobutyronitrile) (Porofor N). Among the most useful peroxidic catalysts are benzoyl peroxide, acetyl peroxide, di-tert.-butyl peroxide, tert.-butyl perbenzoate, and tert.-butyl hydroperoxide. The choice of catalyst will depend upon the temperature at which it is convenient to carry out the polymerization. For example, acetyl peroxide usually is employed at temperatures below 50° C., benzoyl peroxide at about 60–80° C., and di-tert.-butyl peroxide at 125–135° C. However, the temperature is a matter of choice, and may be varied widely.

The temperature for the polymerization reaction is selected in accordance with the temperature at which the catalyst decomposes to give free radicals at a useful rate, and, if soluble and fusible polymers are desired, the temperature is kept below that at which the polymers are convertible to the infusible, insoluble condition. The heteropolymers may be made in the mass or oil phase, either with or without a suitable organic solvent; they can also be made by known aqueous-emulsion techniques.

The following examples are given to illustrate the preparation of typical new maleimidomethyl esters, and resins derived from them, it being understood that the invention is not confined thereto; parts are by weight.

Example 1

To a suspension of 10 parts of N-methylolmaleimide in 10.2 parts of acetic anhydride was added 0.2 part of concentrated sulfuric acid, causing a vigorous, exothermic reaction to take place. When the reaction appeared to be ended the solution was cooled and diluted with water, precipitating the white crystalline product, maleimidomethyl acetate. After filtration and drying, it melted at 91–92° C. Recrystallization from ethanol did not change the melting point. Yield, 12.3 parts, or 92.6% of theory.

*Analysis.*—Calcd. for $C_7H_7O_4N$: Nitrogen, 8.28%. Found: Nitrogen, 8.12%, 8.12%.

This new compound can be polymerized as shown in Examples 8 to 12, to form useful new resins.

Example 2

A solution of 5 parts of N-(chloromethyl)maleimide in 21 parts of glacial acetic acid was refluxed for a few hours and then poured into ice water. The white product melted at 89–91° C. A mixed melting point determination showed the product to be the same compound as that formed in Example 1. Yield 2.5 parts, or 43% of theory.

The same result was obtained when a mixture of sodium acetate and acetic acid was reacted with N-(chloromethyl)-maleimide.

Example 3

To a mixture of 6.3 parts of pyridine and 11.2 parts of benzoyl chloride in 20 parts of acetone was added 10 parts of N-methylolmaleimide, causing evolution of heat and darkening of the solution. When the exothermic reaction had ended the mixture was cooled to room temperature, and the precipitated pyridine hydrochloride was filtered off. The filtrate was diluted with an equal volume of water, throwing out an oil which quickly crystallized. The product, maleimidomethyl benzoate, was recrystallized successively from acetone and from aqueous alcohol to give white crystals melting at 122.0–123.5° C. The yield was 66% of theory.

*Analysis.*—Calcd. for $C_{12}H_9O_4N$: Nitrogen, 6.06%. Found: Nitrogen, 6.01%, 6.02%.

This new compound can be polymerized to form useful new resins.

Example 4

A mixture of 10 parts of N-methylolmaleimide, 7.9 parts of succinic anhydride and 40 parts of benzene was boiled under reflux for a few minutes and filtered, and the filtrate was cooled and filtered again. The maleimidomethyl hydrogen succinate was recrystallized from benzene; melting point, 80.5–82.0° C.; yield, 16.2 parts (98% of theory) of white needles, soluble in water, ethanol and benzene; insoluble in ligroin.

*Analysis.*—Calcd. for $C_9H_9O_6N$: Nitrogen, 6.18%. Found: Nitrogen, 6.31%, 6.25%.

This new compound, in which the acyl group contains additional non-esterified carboxyl, can be polymerized, as shown in Example 14, to form useful new resins.

Example 5

To a mixture of 10 parts of N-methylolmaleimide and 10.5 parts of propionic anhydride there was added 0.2 part of concentrated sulfuric acid, causing an immediate exothermic reaction. When the evolution of heat had subsided the solution was mixed with water and then extracted with benzene. The benzene fraction was dried and fractionally distilled. The maleimidomethyl propionate, boiling at 87–88° C. at 0.2 mm. Hg, was obtained in 53% yield, 7.7 parts. On strong cooling it solidified; melting point, 42–44° C. After recrystallization from a mixture of benzene and Skellysolve B (n-hexane) it melted at 44–44° C.; soluble in ethanol, acetone, ether and benzene; insoluble in water, ligroin.

*Analysis.*—Calcd. for $C_8H_9O_4N$: Nitrogen, 7.66%. Found: Nitrogen, 7.60%, 7.62%.

This new compound can be polymerized, as shown in Example 13, to form useful new resins.

Example 6

An immediate exothermic reaction occurred when 21 parts of trifluoroacetic anhydride and 12.7 parts of N-methylolmaleimide were mixed. The mixture was left overnight at room temperature, and was then fractionally distilled in vacuo. The maleimidomethyl trifluoroacetate, boiling at 80.5–81° C. at 1.0 mm. Hg, was obtained in 86% yield, 19.1 parts of a material which crystallized on cooling; melting point, 68.5–69.5° C.; soluble in ethanol, ether, benzene; insoluble in ligroin.

*Analysis.*—Calcd. for $C_7H_4O_4F_3N$: Nitrogen, 6.29%. Found: Nitrogen, 6.27%.

This new compound can be polymerized to form useful new resins which have good flame resistance.

Example 7

To a suspension of 10 parts of N-methylolmaleimide in 14.2 parts of butyric anhydride was added 0.2 part of concentrated sulfuric acid. The mixture was heated gently until the solution became homogeneous, and then it was cooled to room temperature and diluted with benzene. It was washed several times with water, dried over sodium sulfate and fractionally distilled in vacuo. The yield of maleimidomethyl butyrate was 75% of theory (11.6 parts of a water-white liquid); boiling point, 106.0–107.5° C. at 0.6 mm. Hg; $n_D^{20}$, 1.4820.

*Analysis.*—Calcd. for $C_9H_{11}O_4N$: Nitrogen, 7.11%. Found: Nitrogen, 6.90%, 7.06%.

This new compound homopolymerizes in air at room temperature within a few days after preparation unless an inhibitor of free radical polymerization, such as hydroquinone, is present. This monomer may be used in the same way as the acetate described in Example 1.

The following examples deal with polymerization of my new esters.

Example 8

A mixture of 10 parts of maleimidomethyl acetate (see Example 1), 30 parts of acetone and 0.1 part of benzoyl peroxide was heated at 60° C. for several hours, cooled to room temperature and poured into methanol to precipitate the polymerized maleimidomethyl acetate. It was filtered off and dried in vacuo. The white powdery polymer was obtained in 69% conversion. It is soluble in acetone, dioxane, and dimethylformamide; $[\eta]$ in dimethylformamide, 0.37.

*Analysis.*—Calcd. for $(C_7H_7NO_4)_x$: Nitrogen, 8.28%. Found: Nitrogen, 7.94%, 7.93%.

This resin may be used as a molding powder.

Examples 9, 10, 11 and 12

Each of the following copolymers was made by heating a mixture of maleimidomethyl acetate (A) with a comonomer (B) in the presence of 2 parts of benzoyl peroxide, except as noted, and 100 parts of acetone per 100 parts of the mixture of the two monomers, for several hours at about 70° C. with stirring. Then the solutions, which were very viscous at room temperature, were poured into rapidly stirred methanol in order to precipitate the copolymers. Each copolymer was filtered and dried at a pressure of 0.1 mm. Hg until it had come to constant weight. Each copolymer is a white powder. The intrinsic viscosity was measured in dimethylformamide, unless noted otherwise.

| Example | (B) Comonomer | (A)/(B) Feed Ratio | Copolymer | | |
|---|---|---|---|---|---|
| | | | Conversion (percent) | $[\eta]$ | Nitrogen (percent) |
| 9 | Styrene | 50:50 | 27 | 1.96 | 5.09 |
| 10 | Vinyl acetate | 30:70 | 43 | b 0.58 | 5.40 |
| 11 | Acrylonitrile | 20:80 | 62 | 1.65 | 23.76 |
| 12 a | Vinyl chloride | 20:80 | 6 | b 0.11 | 5.87 | a Catalyst was Porofor N, two parts.
b In dioxan.

Example 13

A mixture of 10 parts of maleimidomethyl propionate, 40 parts of methyl vinyl ketone and 0.3 part of benzoyl peroxide was heated at 65–68° C. for 15 minutes, and then was poured into methanol to precipitate the copolymer in the form of a viscous gum. This gum was swelled in dioxane. The mixture of swollen copolymer and dioxane was put through a blender, and was then poured into methanol. The copolymer was filtered and dried in vacuo. The copolymer, an off-white, slightly gummy resin, was insoluble in all organic solvents tried. Conversion 13%; nitrogen 0.78%; carbon 66.31%; hydrogen 8.20%.

Example 14

A mixture of 10 parts of maleimidomethyl hydrogen succinate, 40 parts of styrene, 0.5 part of Porofor N and 25 parts of dioxan was heated for 10 minutes at 64–74° C., and then was poured into methanol to precipitate the copolymer as a white powder. It was insoluble in all organic solvents tried. Conversion 14%; nitrogen 4.32%; carbon 64.64%; hydrogen 5.87%.

My new resins may be used as molding powders and/or varnish bases, especially when the polymerization is interrupted before crosslinking and insolubilization has occurred.

In the claims "acyl" refers to groups containing additional non-esterified carboxyl groups as well as those without such, as illustrated in Examples 4 and 14.

Having thus described my invention, what I claim and desire to protect by Letters Patent is:

1. A resinous polymerizate, the monomeric constituents of which are composed of at least 5% by weight of a monomeric chemical having the formula

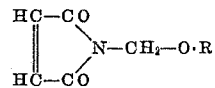

R being an acyl radical of a carboxylic acid, any remaining monomeric constituents being selected from ethylenic compounds having at least one terminal $CH_2=C<$ group which is non-conjugated with respect to any other such group.

2. A heteropolymerizate of a mixture of monomers, composed of at least one monomeric ethylenic compound having at least one terminal $CH_2=C<$ group which is non-conjugated with respect to any other such group, and at least one monomeric maleimidomethyl ester copolymerizable therewith which latter compound has the formula

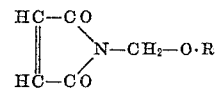

R being an acyl radical of a carboxylic acid.

3. A process which comprises polymerizing, in the presence of a free radical initiator of polymerization, an ethylenic compound having at least one terminal $$CH_2=C<$$

group which is non-conjugated with respect to any other such group, and a monomeric maleimidomethyl compound of the class defined in claim 2.

4. A resinous heteropolymer of a monomeric monovinyl compound and a maleimidomethyl compound of the formula
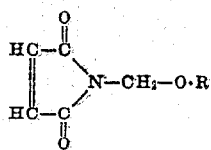
where R is an acyl radical of a carboxylic acid.
References Cited in the file of this patent
UNITED STATES PATENTS
| | | |
|---|---|---|
| 2,487,106 | Cornwell | Nov. 8, 1949 |
| 2,526,517 | Tawney | Oct. 17, 1950 |
| 2,640,832 | Tawney | June 2, 1953 |